Patented May 27, 1952

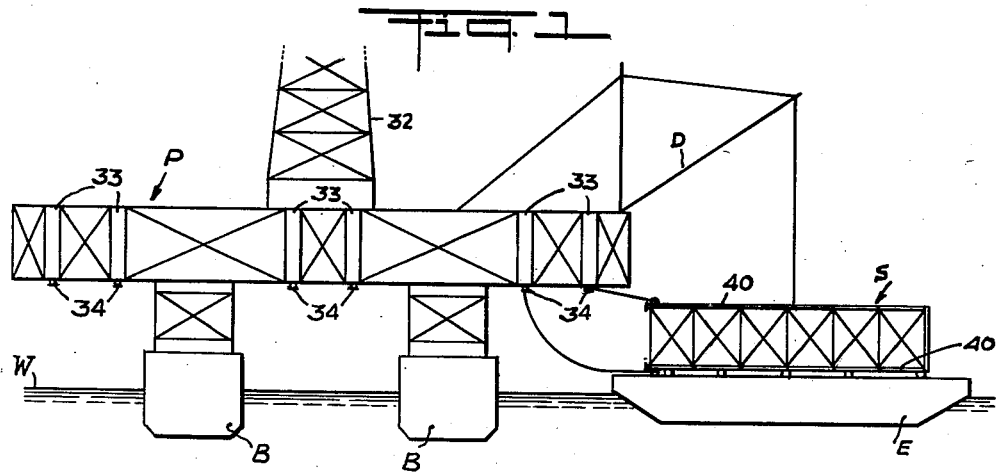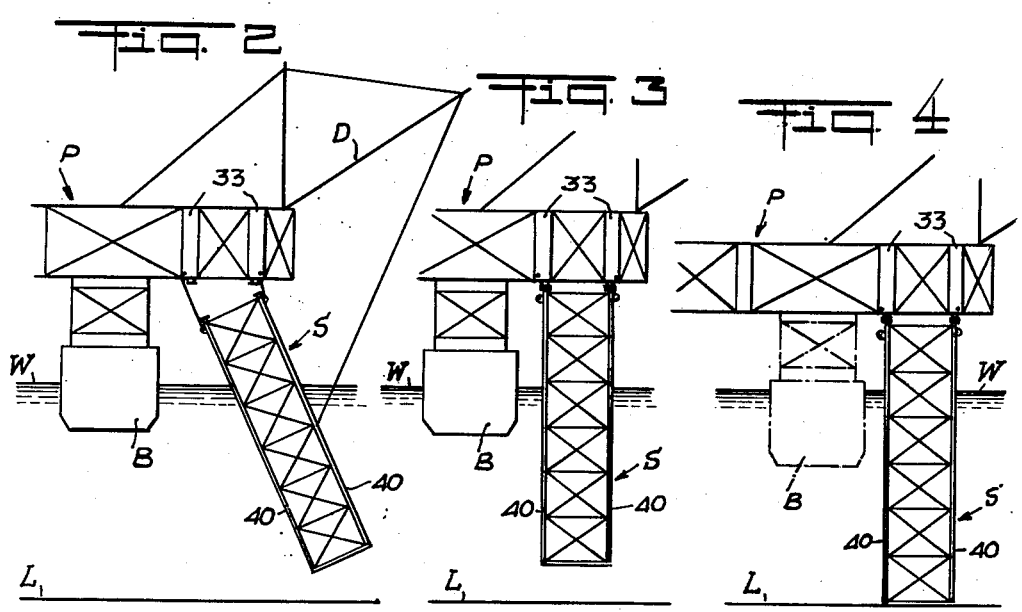

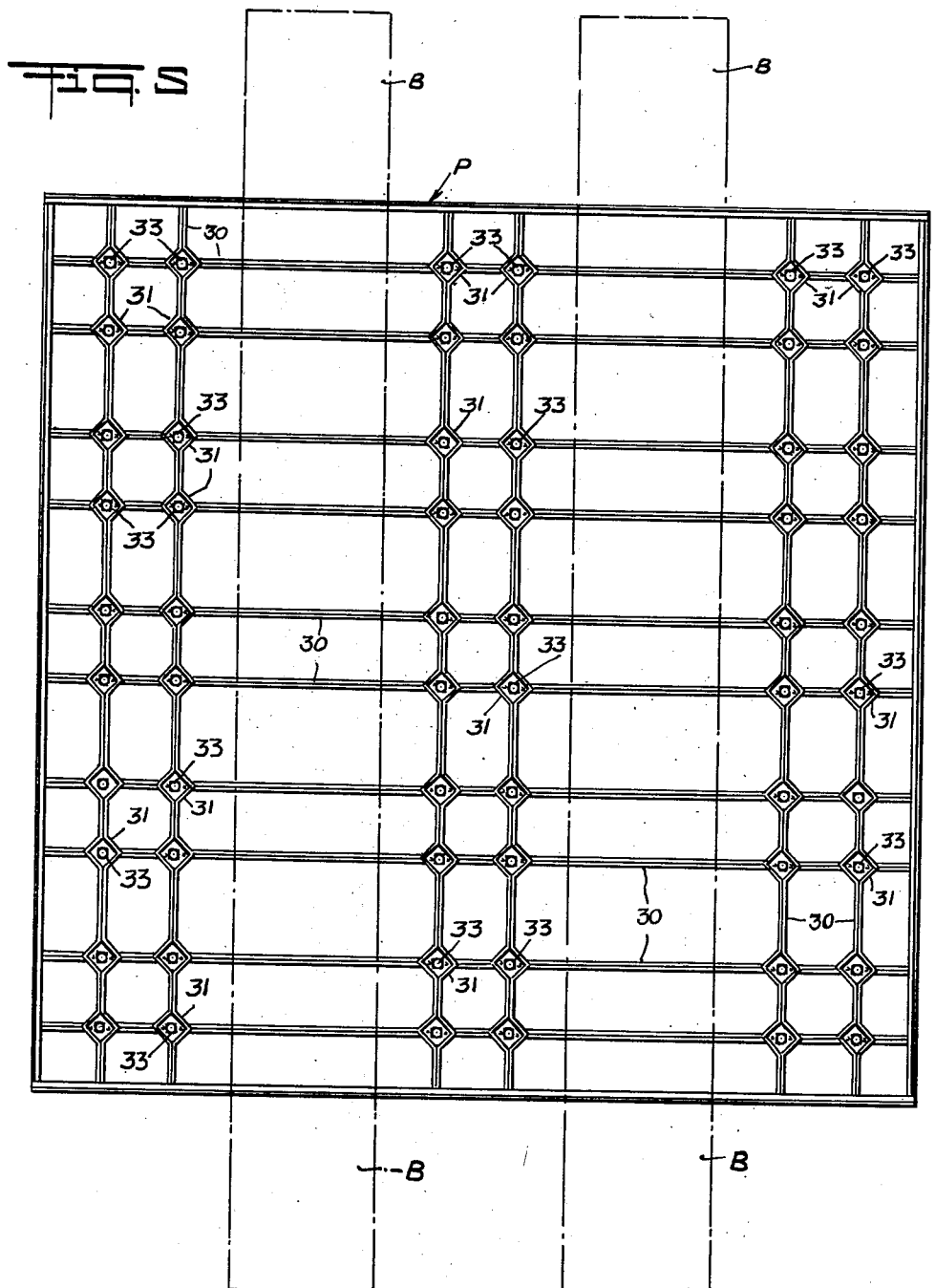

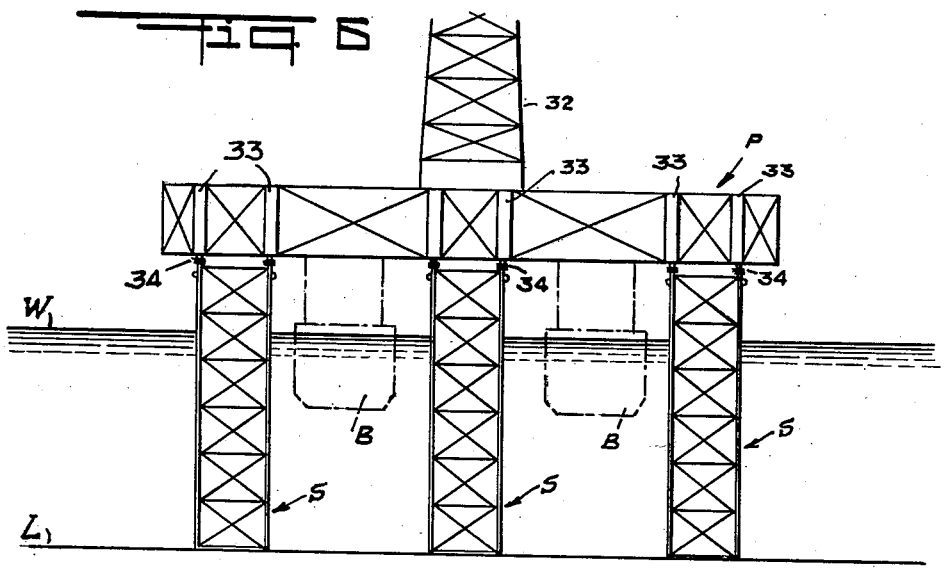
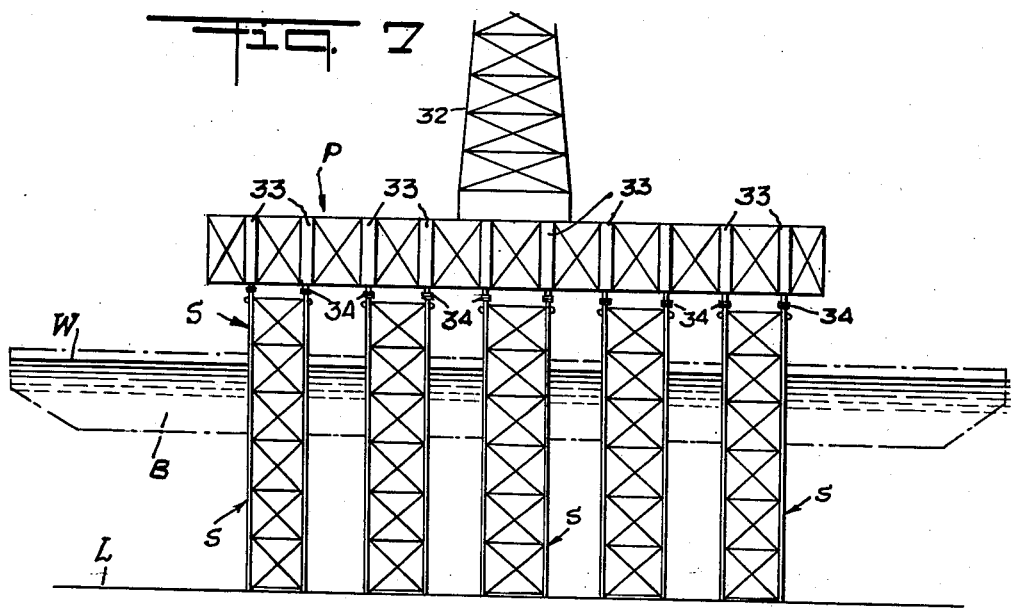

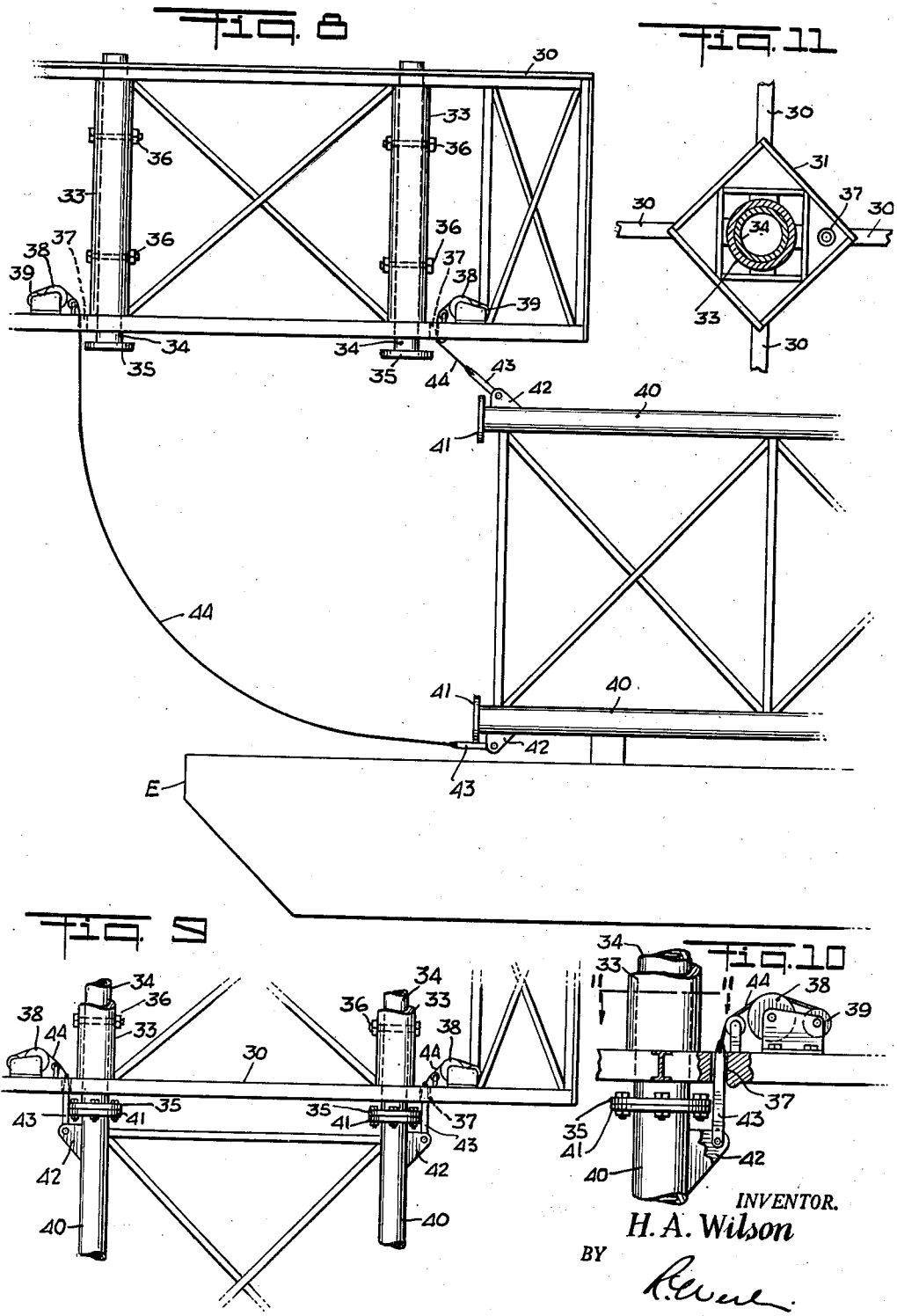

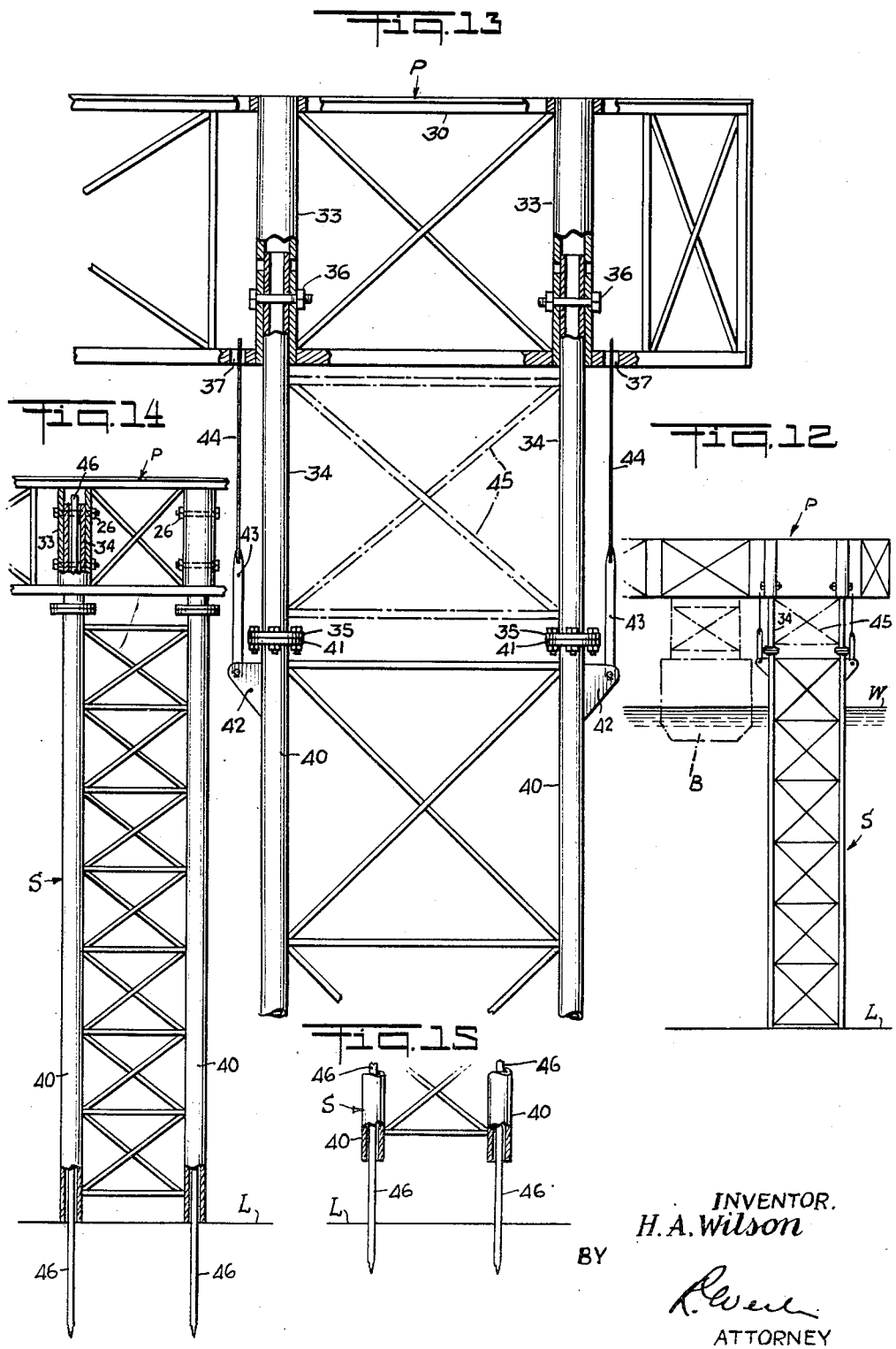

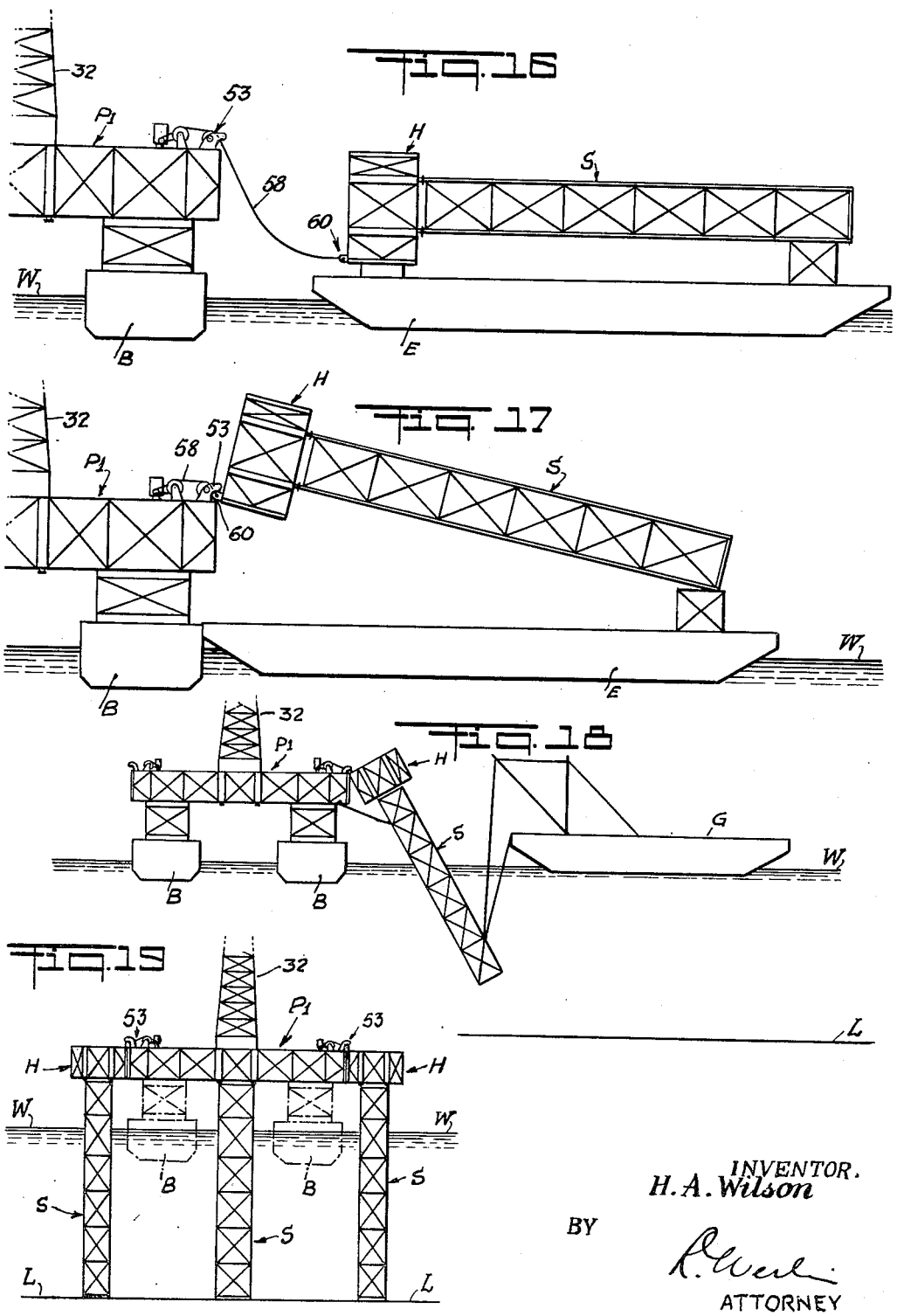

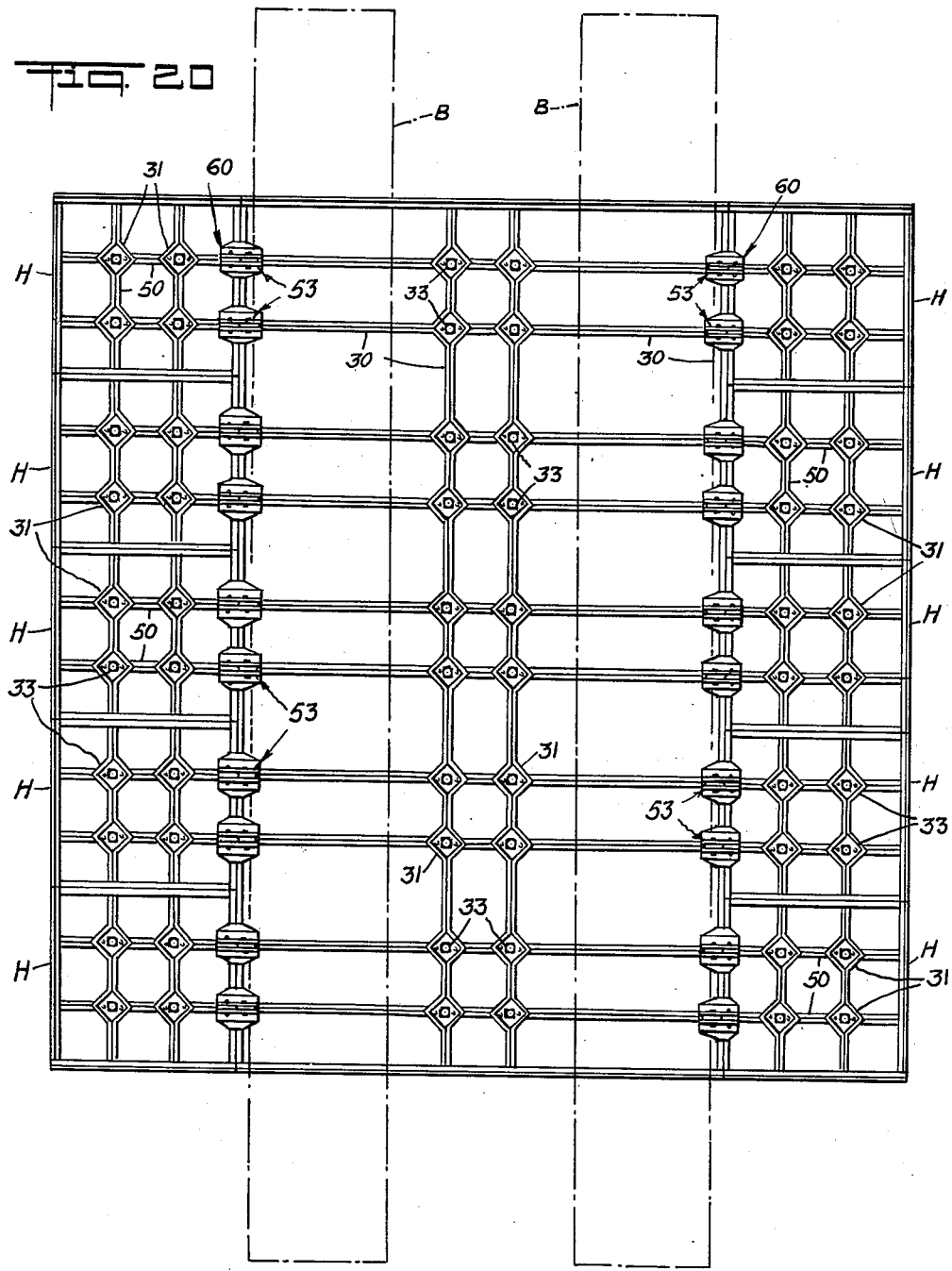

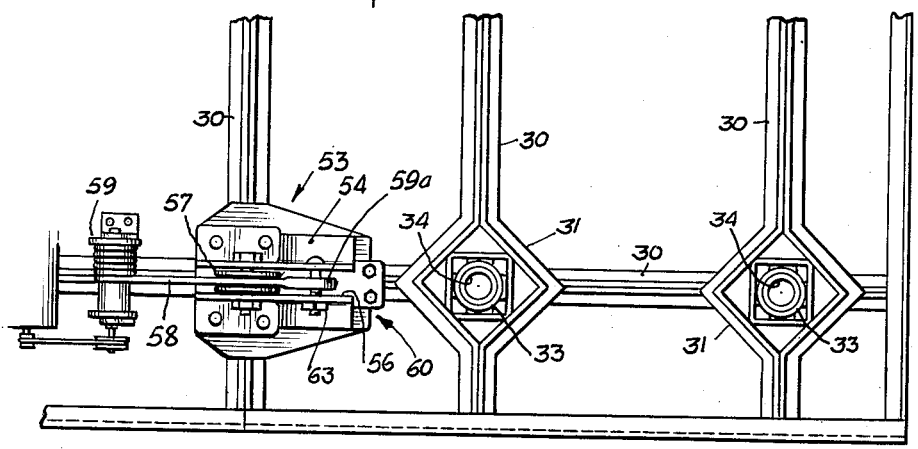
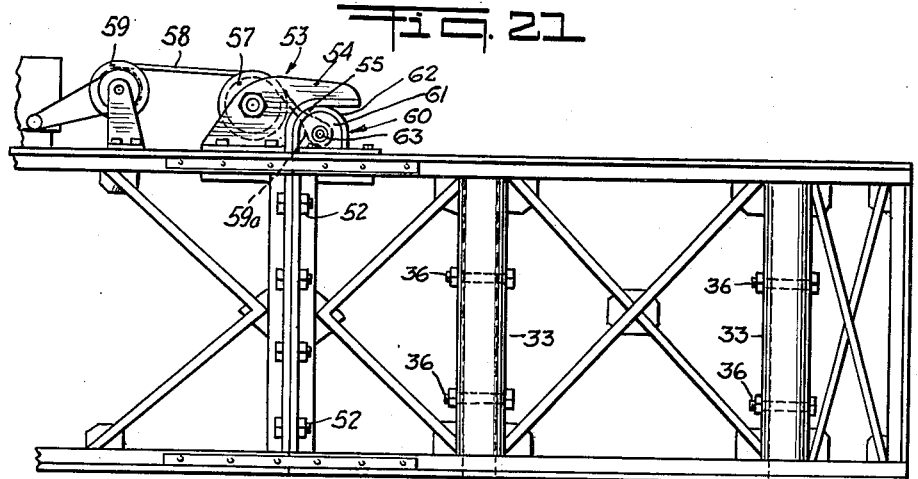
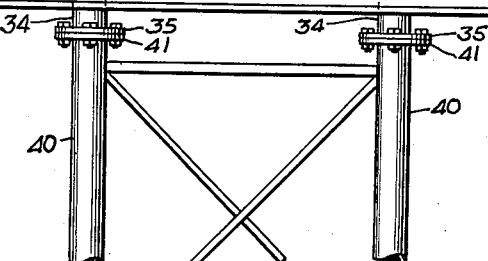
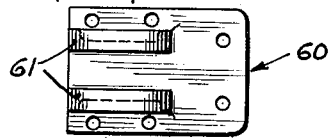

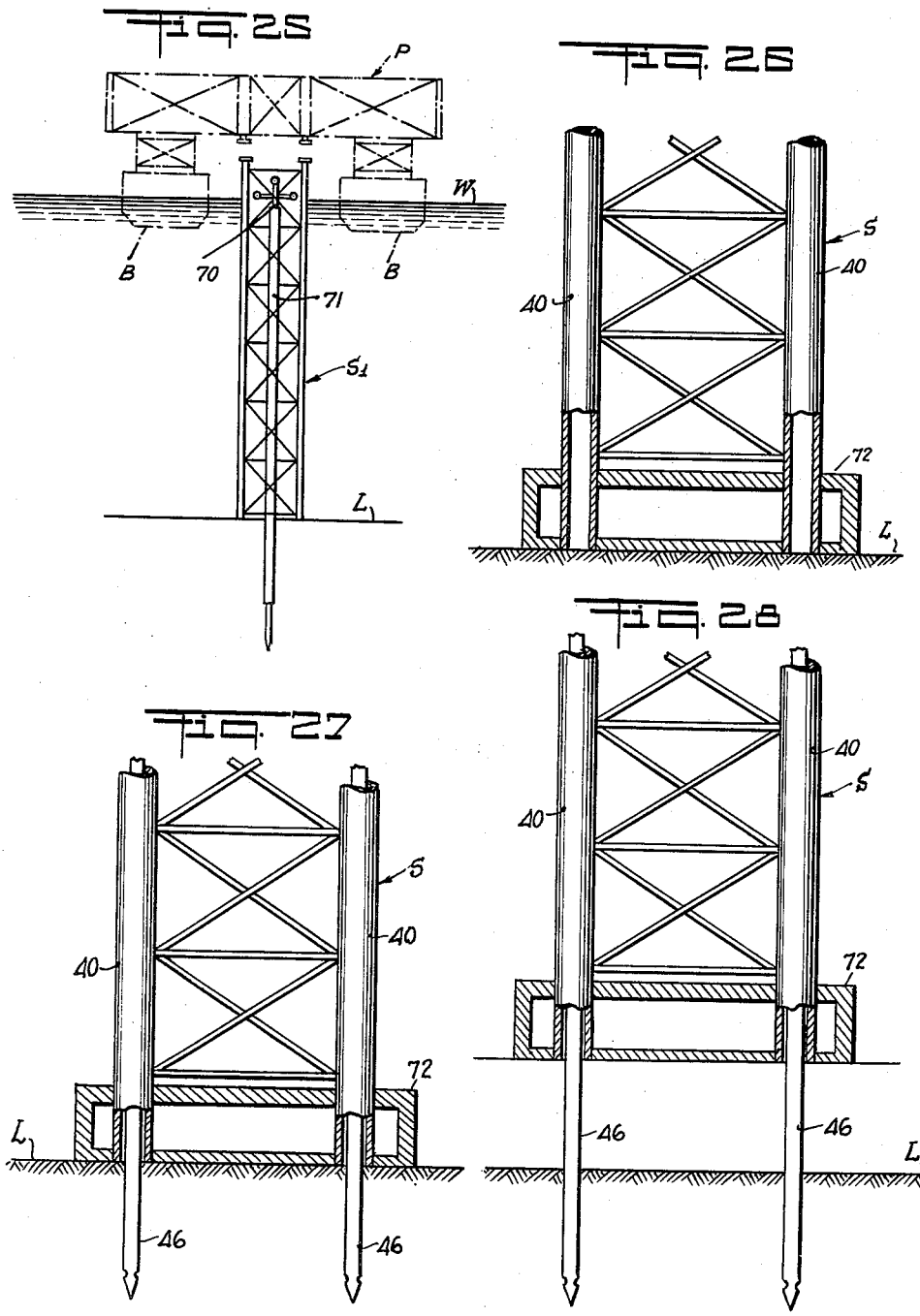

2,598,088

UNITED STATES PATENT OFFICE 2,598,088

OFFSHORE PLATFORM STRUCTURE AND METHOD OF ERECTING SAME

Harvey Ashton Wilson, Brazoria, Tex.

Application January 13, 1949, Serial No. 70,728

6 Claims. (Cl. 61—46)

This invention relates to marine foundation structures and particularly to off-shore working and drilling platforms for oil wells and methods for constructing and erecting same.

The drilling of oil wells in off-shore locations, such as on the continental shelf along the coasts of the United States, particularly off the coast of the Gulf of Mexico, in water depths greater than about 10 or 15 feet, is increasing greatly in importance and creates many new problems in providing firm and safe support for the heavy drilling rigs employed. Since such locations may be many miles from shore, open ocean conditions prevail, including often severe wind and wave conditions, which make for great expense and difficulty in transporting and erecting foundations which are adequate to meet the conditions encountered.

Drilling platforms which are most widely used at present, are ordinarily constructed in the form of large templates composed of a plurality of sections, each of which comprises a group of spaced hollow steel columns inter-laced with structural bracing. The columns are normally made of a fixed length such as to extend from the land bottom underlying the water location to above average wave level. Each of these template sections are transported to the water location and set up on bottom, and piling is then driven through the hollow columns into the underlying land to firmly anchor the sections in place. When the requisite number of such template sections have been put in place and anchored with piling, a structural steel platform is then constructed, in generally piece-meal fashion, on their upper ends and the drilling rig and its appurtenances must then be moved in and erected on the platform. This type of construction entails a great amount of labor, large erection crews of men and equipment, and extremely high costs, not only in erecting the platform but also in removing it when drilling is completed. Since there is no positive method of determining beforehand whether or not oil in producing quantities will be found at a particular location, the costs involved in erecting and removing such foundation structures at the number of locations necessary to properly explore and develop even a few square miles of off-shore area is enormous and may prove uneconomic and even prohibitive for the very largest companies engaged in such operations.

The present invention, therefore, has for its principal object the provision of an improved drilling platform which may be employed for off-shore drilling in any of the water depths commonly encountered; which may be erected at a water location with a minimum of difficulty and expense; and which may subsequently be removed for transportation to another location likewise with a minimum of difficulty and expense.

More specific objects of this invention are to provide an off-shore foundation structure composed of a relatively small number of major units comprising a pre-fabricated platform section and a number of separate supporting piers or columns adequate to support the platform section and the load thereon from the land bottom, the platform section being adapted to serve as a working platform from which the operations of handling and attaching the individual pier sections may be conducted.

Other objects include specific means and methods for accurately and efficiently guiding and connecting the pier sections to the platform section, and for positioning the completed structure on the land bottom.

The foregoing and other objects and advantages of this invention will become apparent from the following detailed description when read in conjunction with the accompanying drawings which illustrate several embodiments in accordance with this invention.

In the drawings:

Fig. 1 is an end elevation of the platform section of a structure in accordance with one embodiment of this invention, illustrating one stage in the attachment of supporting pier sections thereto;

Figs. 2, 3 and 4 are fragmentary views of the structure of Fig. 1 illustrating several subsequent stages in the attachment of the pier sections to the platform section;

Fig. 5 is a diagrammatic plan view of the platform section;

Fig. 6 is an end elevation of the fully erected structure, showing in broken lines removable buoyant supports employed during erection and removal of the structure;

Fig. 7 is a side view of the erected structure;

Fig. 8 is an enlarged fragmentary view showing the relative positions of the platform section and the end of one pier section at a stage of erection corresponding to that illustrated in Fig. 1;

Fig. 9 is an enlarged fragmentary view of the platform and pier sections at a stage of erection corresponding to that shown in Figs. 3 and 4;

Fig. 10 is a detail showing the guide and connection elements between the platform and pier sections;

Fig. 11 is a cross-sectional view along line 11—11 of Fig. 10;

Figs. 12 and 13 illustrate extensible connection elements for connecting the pier sections to the platform section;

Figs. 14 and 15 illustrate two structural modifications employing piling for anchoring the platform structure to the land bottom;

Figs. 16, 17, 18, and 19 are views illustrating a series of erection stages of a structure in accordance with another embodiment of this invention;

Fig. 20 is a diagrammatic plan view of the structure illustrated in Figs. 16 to 19 inclusive;

Fig. 21 is an enlarged fragmentary side elevational view showing the relative positions of the platform section and a pier section at a stage of erection corresponding to that illustrated in Fig. 19;

Fig. 22 is a plan view of the fragmentary portion illustrated in Fig. 21;

Figs. 23 and 24 are details of one of the connection elements employed in the embodiment of Fig. 16;

Fig. 25 is a view of a central pier section separable from the main structures of the principal embodiments to serve as a well head platform or crib after removal of the major portions of the main structures; and Figs. 26, 27 and 28 illustrate additional modifications of principal structural embodiments in accordance with this invention.

Referring first to the embodiment illustrated in Figs. 1 to 11, inclusive, the structure comprises generally a platform section, designated generally by the letter P, and a plurality of detachable pier sections, each designated generally by the letter S. Platform P is constructed of a plurality of parallel structural trusses 30 extending longitudinally and transversely of the area of the platform and intersecting each other at a plurality of suitably framed column points 31 (see Fig. 11), to form a generally rectangular box-like open-work structure having a surface area of requisite dimensions for its intended purpose as a working platform. When used as a drilling platform, a conventional drilling derrick 32 may be mounted on the upper surface of the platform section, and will ordinarily be positioned centrally thereof but may be located at other points on the platform surface.

The truss arrangement employed in the platform structure will be designed to provide a plurality of spaced parallel rows of column points extending longitudinally and transversely of the platform section. The spacing between the rows and between the column points in each row may be varied as desired to provide suitably arranged groups of column points which will serve as connection points for the supporting pier sections S. For example, in the illustrative embodiment shown in Figs. 1 to 11, inclusive, one pair of the rows of column points is arranged to extend generally medially of the platform section and another pair of rows is arranged parallel thereto and equidistant therefrom along each of the side edges of the platform section. In this instance the spacing between the rows forming each pair is less than the spacing between the pairs of rows to provide a relatively wide gap between the medial and side pairs (see Fig. 6 particularly). The spacing of the column points in each of the rows is such as to provide spaced groups of four column points which are aligned transversely of the platform section with corresponding groups of column points in the other pairs of rows. The spacing between the groups of column points may be uniform or varying and may be the same as or different from the spacing between the column points in each of the groups.

Enclosed within each of the several column points 31 and extending vertically therethrough is a tubular column 33 which is rigidly connected to the structural elements of the platform section in any suitable and conventional manner to form an integral part thereof (see Fig. 11). Each of the columns 33 is provided with a tubular extension 34 adapted to extend below the lower face of platform section P and provided at its lower end with a bolt flange 35. Tubular extension 34 is slidably inserted in the bore of column 33 and adjustable axially thereof. Bolts 36 extending transversely through the walls of column 33 and extension 34 may be employed to lock extension 34 in any desired position relative to its enclosing column 33 to thereby rigidly lock the extension to the platform section.

Arranged at each column point and preferably along the outer side of each of the columns 33, a tubular guide opening or fairlead 37 (Figs. 8 to 11, inclusive) is provided through the lower truss beams. A winch 38 driven by a motor 39 is supported on the platform structure generally adjacent each of the fairleads, for employment in a manner to be described hereinafter.

Each of the pier sections S is an elongated open-work steel structure generally rectangular in cross-section and composed of a plurality of tubular columns 40 (four in the illustrative embodiment) forming the four corners of the section and suitably laced together by means of conventional structural girders and cross-bracing elements to form a strong load-carrying structure having a high degree of rigidity. The spacing of columns 40 in each group is such as to conform with the spacing and arrangement of each group of four columns 33 in the platform section. The upper ends of columns 40 are provided with bolt flanges 41 adapted to match up with flanges 35 on extensions 34 when the pier section is lined up with a group of the platform columns. The upper end of each of the columns 40 carries an outwardly extending ear or lug 42. A cylindrical guide pin 43 carried on one end of a wire rope 44 is adapted to have its free end pivotally connected to one of the lugs 42, the other end of rope 44 being adapted to be threaded through one of the fairleads 37 and to be wound on winch 38. Guide pins 43 are made to a diameter which will provide a snug sliding fit in fairleads 37 when the guide pins are inserted therein. The lengths of guide pins 43 are made such that when the ends of pier section columns are aligned with extensions 34, the guide pins will extend entirely through fairleads 37. Since the platform section will, as noted, be pre-fabricated, derrick 32 and other parts of a conventional drilling rig and its usual appurtenances (not shown) may be put in place on the platform deck before the structure is moved to its erection location. These parts may, of course, be put in place on location if desired. One or more material handling booms, schematically indicated at D, may be mounted on the platform and used in the subsequent erection operations.

Figs. 1, 2, 3 and 4, illustrate several stages in the operations for attachment of one of the pier sections. In Fig. 1 a pier section S, supported in prone position on a barge E, will be moved toward the side of the platform section with the lug-carrying end thereof headed toward the platform section.

The above-described structure is erected in the following manner:

Platform section P will be fully fabricated and mounted on a pair of elongated barges B which are inserted beneath the platform section and arranged in parallel on opposite sides of the center line thereof, generally under the portions between the medial rows of column points and the side rows to provide a substantially balanced buoyant supporting arrangement under the platform section. Barges B will be provided with suitable and generally conventional type releasable connections to platform section P to permit insertion and removal of the barges from beneath the platform section. The barges will be equipped with conventional ballast handling gear to regulate their buoyancy so as to increase or decrease the draft of the barges as may be required to raise or lower the platform section relative to the water level. The platform section will normally be supported on the barge superstructure at an elevation well above the normal water level W and preferably above the average wave level in the area in which the platform structure is to be erected. The barges are adapted to serve as buoyant supports for the platform section during towing and erection operations to be described hereinafter. A number of ropes 44, generally one for each of the columns 40 of the pier section, are threaded through the appropriate fairleads 37 adjacent the column points 31 to which the pier section is to be attached and their guide pins 43 are connected to the respective lugs 42 on columns 40 (see Fig. 8). Ropes 44 will then be wound on winches 38 to draw the end of the pier section S toward the lower face of the platform section. At the same time, boom D will be employed to lift pier section S off of barge E, which may now be withdrawn, and to lower the free end of the pier section into the water (Fig. 2) as the continued pull on ropes 44 draws the upper end of the pier section inwardly and upwardly toward the column points to which it is to be connected. As the upper ends of columns 40 approach closely to extensions 34, the pull on ropes 44 will draw guide pins 43 into fairleads 37 and their telescopic engagement will serve to effectively align the upper ends of columns 40 with their corresponding extensions 34. Thereupon, bolts will be inserted through the mating flanges 35 and 41 to thereby rigidly attach the pier section to the lower face of the platform section in the desired position. Fig. 3 illustrates this latter stage in the pier connecting operation. By similar operations, a series of pier sections may thus be attached to the lower face of the platform section along each side thereof and to the medial row of column points between the barges B. Ordinarily, the lengths of the several pier sections will be made somewhat less than the distance between the bottom of platform section S and the underlying land bottom L when the platform section is on barges B, so that the pier sections may swing freely above land bottom L during the described connection operations. Accordingly, when the pier sections have all been attached, as described, to the bottom of the platform section, the pier sections will be pendant therefrom and the entire load of the assembled structure will be supported on barges B, with the lower ends of the pier sections spaced from land L. Ballast will now be introduced into the barges to cause them to sink lower into the water a distance sufficient to bring the ends of the pier sections firmly to rest on land bottom L, thereby transferring the load of the platform structure to direct support from the land bottom on pier sections S. Fig. 4 illustrates the position of the structure when thus landed on bottom. Barges B may now be detached from platform section S and withdrawn leaving the fully erected structure in place as illustrated in Figs. 6 and 7. As so erected the structure may be employed as a working platform for the conduct of well drilling or any other desired type of operations therefrom.

To remove the structure, barges B will be re-inserted into their original positions beneath platform section S and their buoyancy will be increased to lift the entire structure a distance sufficient to raise the lower ends of the pier sections above the land bottom to the previously described pendant positions. Ropes 44 will again be connected to lugs 42 on a pier section. Flanges 35 and 41 will be disconnected and the handling line of boom D connected to an appropriate point on the pier section. Rope 44 will then be paid out as the pier section is lifted by boom D until the pier section is returned to the position illustrated in Fig. 1 and reloaded on barge E. Ropes 44 will then be disconnected from the pier section and the latter moved away by barge E. When all of the pier sections have been removed in this manner, the platform section may then be transported to any other location on barges B and the structure re-erected at a new location in the previously described manner.

If the point to which the structure is to be removed is not too distant and the water depth does not vary too greatly from that of the original location, it may not be necessary to disconnect the pier sections to move the structure to the new location. It will only be necessary, in such cases, to re-insert barges B, as previously noted, and lift the entire structure thereon by increasing the barge buoyancy, until the lower ends of the pier sections clear the land bottom sufficiently to allow the entire structure to be transported bodily to the new location with the pier sections in the pendant position.

Figs. 12 and 13 illustrate a modification of the erecting operations by which the pier sections may be extended to the land-supporting position without substantially changing the buoyancy of barges B to lower the platform structure. In accordance with this modification, when a pier section has been connected to extensions 34, as previously described, and is hanging below the platform section with ropes 44 still attached to lugs 42, volts 36 connecting extensions 34 to columns 33 will be removed and ropes 44 paid out by winches 38 to lower the pier section relative to the platform section until its lower end rests on land bottom L. Extensions 34, being connected to columns 40 of the pier section, will slide downwardly through columns 33 as the pier section is lowered and when the latter has landed on bottom, bolts 36 will be re-inserted through the walls of columns 33 and extensions 34 to again rigidly lock the platform section to the pier section in its extended position. Removable cross-bracing 45 will then be installed between the thus exposed portions of extensions 34 to rigidly brace these members and thereby form an extension of the upper end of the pier sections. When all of the pier sections have been landed on bottom in this manner, barges B may be withdrawn without appreciably changing their draft. This arrangement has the advantage that the lengths of the several pier sections may be adjusted to conform to irregularities in land bottom L and thus provides means for landing the platform structure in level position despite irregularities which may be present in the land bottom. The pier sections may be retracted toward the platform section by generally reversing the above procedure and using ropes 44 to retract the pier sections.

It will be understood that in some cases adjustment of the pier sections relative to the platform section may be employed in combination with changes in the draft of barges to suitably land the platform structure on the land bottom.

Figs. 14 and 15 illustrate further modified arrangements employed in erecting structures in accordance with this invention. As illustrated in Fig. 14, anchor piles 46 of any suitable design may be driven through one or more of the registering bores of extensions 34 and columns 40 into land bottom L to anchor the structure to the bottom, particularly to prevent lateral shifting of the structure relative to the bottom. When driving such piles bolts 36 will first be removed to allow passage of the piles through the extensions 34. After the piles are driven, the upper ends of the piles remaining enclosed within extensions 34 and columns 33 may be transversely pierced so that when bolts 36 are reinserted, they will pass through the piles and thereby lock the structure to the piles directly. At least part of the load of the platform structure may be thus transferred to the piles.

Fig. 15 illustrates a modification in which piles 46 are driven through columns 40 of the pier sections while the latter are suspended above the land bottom, as in the position illustrated in Fig. 3. Since bolts 36 must be withdrawn to allow passage of the piles, thereby releasing extensions 34, the pier sections may be supported against downward movement by leaving ropes 44 attached thereto and employing these ropes to hold the pier sections in their elevated positions while the piles are driven into the land bottom. Thereafter, bolts 36 or other suitable holding elements will be employed, as described above, to lock the platform section to the piles. In this instance, the piles will necessarily support the entire load of the platform structure and pier sections S will serve as bracing templates between the piles.

It will be understood that pile modifications may also be used, in the manner above described, with the extended pier section arrangements illustrated in Figs. 12 and 13.

Figs. 16 to 24, inclusive, illustrate another principal embodiment in accordance with this invention in which a plurality of pier sections S are hingedly attached along the sides of the platform section, and additional pier sections may be connected beneath the platform section in the same manner as in the first above-described principal embodiment.

In the present embodiment, a platform section P₁ has substantially the same structural form as platform section P being constructed of intersecting trusses 30 and provided with at least one pair of rows of column points 31 extending along the longitudinal axis of the platform section. These column points enclose columns 33 and adjustable extensions 34 as in the previously described embodiment.

The pier sections S are also of the same general structural form as those previously described but each has attached to its upper end a rectangular head section H which is constructed in the same form as the main platform section. That is, head section H is constructed of a plurality of intersecting trusses 50 having column points identical in construction with those of the main platform section, the column points and the other parts thereof being designated by the same numerals as in the previous embodiment.

Head sections H are designed to form segments of the main platform section, so that when the pier sections to which they are connected are put in place, along the sides of the platform section, as will be described hereinafter, the head sections will form lateral extensions of the platform section and are in end abutting relation longitudinally of the main platform section to thereby form continuous lateral extensions of the main platform section (see Fig. 20). Bolts 52 or other suitable connection means (Fig. 21) are employed to rigidly lock together adjacent frame members of the platform section and the head sections when the latter are in place and it will be understood that similar connection means will be employed to lock the head sections to each other, whereby the platform section and the head sections will become a continuous unitary structure.

Mounted on the upper surface of the platform section and spaced longitudinally along its side edges are a series of hinge members, designated generally by the numerals 53. Each of the hinge members 53 (Figs. 21 and 22) comprises an upwardly and outwardly extending keeper member 54 having a curved face 55 facing outwardly and downwardly relative to the side edge of the platform section. Keeper member 54 has a central slot 56 in which is journalled a guide pulley 57. One end of a wire cable 58 is trained over pulley 57 and through slot 56 onto a power driven winch 59 mounted on the platform section rearwardly of hinge member 53. The free end of cable 58 is provided with an eye 59a. A series of hinge members, designated generally by the numerals 60, are mounted in spaced apart relation along the inner edges of the upper decks of head sections H in registration with hinge members 53. Each hinge member 60 (see Figs. 21, 22, 23 and 24) comprises a pair of spaced apart upstanding lug members 61—61 having curved edges 62 adapted to engage the curved face 55 of keeper members 54. Eye 59a is adapted to enter the space between lug members 61 and to be connected thereto by means of a removable bolt 63 arranged to extend transversely through the lug members and the eye.

Figs. 16 to 19, inclusive, illustrate several stages in the erection of the structure. Platform section P₁ will be prefabricated and mounted on a pair of barges B, the latter extending longitudinally beneath the platform section on opposite sides of the center thereof and inwardly of the side edges. The platform section will be transported on the barges to the water location and the pier sections S, each having its head section H connected thereto, will be transported in prone position (Fig. 16) on barges E to the location. The pier sections will be moved in toward the sides of the platform section with head sections H headed toward the platform section as shown in Fig. 16. Cables 58 will be trained through two or more of the keeper members 53 which are in registration with lug members 60 on the pier section and connected to the lug members. Cables 58 will then be wound on winches 59 drawing the upper inner edge of head section H upwardly and inwardly until lug members 60 are guided into engagement with the curved faces of keeper members 54 (see Fig. 17). The upper inner edge of the head section thus becomes pivotally connected to the side of platform section P₁. The outer end of the pier section is then lifted off of barge E in any suitable manner, as by handling boom carried on a work boat G (Fig. 18) and is lowered into the water and permitted to swing downwardly and inwardly until the pier section hangs vertically alongside the platform section. Bolts 52 are now inserted to rigidly connect head section H to the side of the platform section. When the side rows of pier sections have all been connected, as above described, a central row of pier sections will be connected beneath the center of the platform section in the same manner as was described above in connection with Figs. 1 to 11, particularly.

When all of the pier sections have thus been connected, they will be hanging from the platform section with their lower ends clear of land bottom L. The structure may be set down on bottom in either of the ways previously described, that is by increasing the submergence of barges B or by extending the pier sections by adjustment of column extensions 34. Barges B may then be removed and the structure is ready for use. Removal of the structure may be effected by generally reversing the steps of the erection operations. The modifications, employing piles 46 may be applied to the present embodiment in substantially the same manner as was described for the previously described embodiment.

Fig. 25 illustrates the manner in which one or more of the pier sections may be detached from the platform structure at the time of removal to provide a protective crib and platform about the head 70 and upper portions of a well 71 drilled from the platform.

Where the platform structure is employed as a well drilling platform, the drilling derrick will ordinarily be located centrally of the platform over the medial row of pier sections. The well will be drilled through the center of the central pier section S₁ and when completed the well head 70 will be enclosed within this pier section and below the bottom of the platform section P or P₁, as the case may be. When it is desired to move the platform structure after completion of a well, the upper ends of columns 40 of the pier section will be disconnected from extensions 34. The platform structure may then be lifted up on barges B providing clearance between the upper end of pier section S₁ and the lower face of the platform section, and the platform structure may then be floated away on the barges, as previously described, leaving pier section S₁ in place about the well head to serve as a protective crib therefor and to provide a small working platform about the well head.

Figs. 26, 27 and 28, illustrate additional structural modifications applicable to both the principal embodiments previously described. In Fig. 26 the lower ends of pier sections S may be equipped with hollow chambers 72 through which hollow columns 40 extend. Chambers 72 are adapted to form spread footings for the pier sections to increase their bearing area on the land bottom and to provide buoyancy chambers useful in supporting the outer ends of the pier sections during lowering and raising operations. The buoyancy of chambers 72 may be controlled in any suitable and conventional manner, as illustrated and described in detail in my co-pending application Serial No. 34,639, filed June 23, 1948.

Fig. 27 illustrates the modification of Fig. 26, further modified by driving piles 46 through hollow columns 40 into the land bottom L to anchor the pier sections thereto. Fig. 28 corresponds to the modification of Fig. 15 but employing hollow chambers 72. In this modification, the buoyancy of the chambers may be regulated to furnish a degree of buoyant support for the platform structure, the balance of the load thereof being taken by piles 46.

It will be understood that pier sections S may be constructed as continuous hollow concrete or steel columns, instead of in the open-work structural form illustrated and described herein. In particular the pier section S₁ (Fig. 25), which is designed to enclose a well head and to be left in place when the balance of the platform structure is removed, may be constructed of suitably reinforced concrete, so as to form a permanent protective structure for the well. Moreover pier sectionals S may be transported to the water location by various means other than barges E. For example, they may be made self-buoyant, as by temporarily plugging the ends of columns 40. Where hollow footings 72 are employed, these together with hollow columns 40 may be employed to float the pier sections to the location.

Moreover, by the use of cables 44 and their associated aligning members, the pier sections may be picked up from the land bottom and swung and guided into place on the platform section. Or the pier sections may be set on end on the land bottom in position registering with the appropriate rows of column points and the platform section floated over their ends, whereupon cables 44 may be employed to lift the pier sections vertically into attaching position. It will also be understood that the particular structural form and dimensions of pier sections S may be varied widely. Instead of the four column arrangement of the illustrative embodiments, pier sections S may be dimensioned to extend the full length of the platform section. Thus the platform structures of the principal embodiments may comprise only four units, namely, a platform section and three pier sections.

It will be understood that numerous other changes and alterations may be made in the details of the illustrative embodiments of this invention within the scope of the appended claims but without departing from the spirit of this invention.

What I claim and desire to secure by Letters Patent is:

1. The method of erecting an off-shore platform structure, which comprises, bodily transporting a unitary platform section to an off-shore location buoyantly supported in horizontal position on barges, transporting a plurality of unitary elongated pier sections to said water location, connecting certain of said pier sections in depending position to spaced points on the underside of said platform section and others of said pier sections to the perimeter of said platform section at opposite sides thereof while the latter remains buoyantly supported on said barges, thereafter transferring the load of said platform section and the connected pier sections from buoyant support by said barges to direct support by said pier sections on the underlying land bottom, and finally removing said barges from beneath said platform section.

2. The method of erecting an off-shore platform structure which comprises, bodily transporting a unitary platform section to an offshore location buoyantly supported in horizontal position on barges, transporting a plurality of unitary elongated pier sections to said offshore location, connecting certain of said pier sections in depending position to spaced points on the underside of said platform section and others of said pier sections to the perimeter of said platform section at opposite sides thereof while the latter remains buoyantly supported on said barges, thereafter submerging said barges sufficiently to lower the depending pier sections into contact with the underlying land bottom to thereby transfer the load of said platform section from said barges to said pier sections, and finally withdrawing said barges from beneath said platform section.

3. The method of erecting an off-shore platform structure, which comprises, bodily transporting a unitary platform section to an offshore location buoyantly supported in horizontal position and barges, transporting a plurality of unitary elongated pier sections to said offshort location, connecting certain of said pier sections in depending position to spaced points on the underside of said platform section and others of said pier sections to the perimeter of said platform section at opposite sides thereof while the latter remains buoyantly supported on said barges, thereafter extending said pier sections downwardly relative to said platform section until the lower ends of said pier sections are in load-supporting contact with the underlying land bottom to thereby transfer the load of said platform section from said barges to said extended pier sections, and finally withdrawing said barges from beneath said platform section.

4. An off-shore platform structure, comprising, a horizontally disposed platform section, a plurality of vertical downwardly extending pier sections detachably connected at laterally spaced points to the lower face of said platform, and a plurality of additional vertical downwardly extending pier sections arranged adjacent opposite sides of said platform and having their upper ends hingedly connected to the upper edge of said platform section, all of said pier sections being dimensioned to extend to the land bottom underlying a water body to support said platform section above the surface of said water body.

5. An off-short platform structure, comprising, a horizontally disposed platform section, a plurality of elongated pier sections vertically disposed beneath said platform section, separable means for detachably connecting said pier sections to the lower face of said platform section, additional elongated pier sections vertically disposed along opposite sides of said platform section, and separable means for connecting said additional pier sections to the opposite sides and upper edge of said platform section, the latter separable means including cooperating hinge members carried by the upper edge of said platform section and the upper ends of said additional pier sections to permit lateral swinging movement of said additional pier sections relative to said platform section, all of said pier sections being dimensioned to extend to the land bottom underlying a water body to support said platform section above the surface of said water body.

6. An off-shore platform structure, comprising, a horizontally disposed platform section, a plurality of elongated pier sections detachably connected to said platform to support the latter from the underlying land, and means for connecting said pier sections to said platform section, said means comprising, a plurality of spaced-apart tubular column members vertically disposed throughout said platform section and rigidly connected thereto, tubular sleeve members extending through said column members and axially slidable therein to adjustably extend the lower ends thereof beneath the lower face of said platform section, means for locking said sleeve members in adjusted position to said column members, and separable means for connecting the upper ends of said pier sections to the lower ends of selected ones of said sleeve members.

HARVEY ASHTON WILSON.

REFERENCES CITED

The following references are of record in the file of this patent:

UNITED STATES PATENTS

| Number | Name | Date |
| --- | --- | --- |
| 873,581 | McQueen | Dec. 10, 1907 |
| 2,210,408 | Henry | Aug. 6, 1940 |
| 2,352,370 | Carruthers | June 27, 1944 |

FOREIGN PATENTS

| Number | Country | Date |
| --- | --- | --- |
| 149,137 | Great Britain | 1920 |
| 405,437 | Germany | 1924 |